April 5, 1960     M. E. SINGLEY     2,931,335
SILO TYPE SELF-FEEDING HOPPER AND TROUGH
Filed Nov. 23, 1956     2 Sheets-Sheet 1
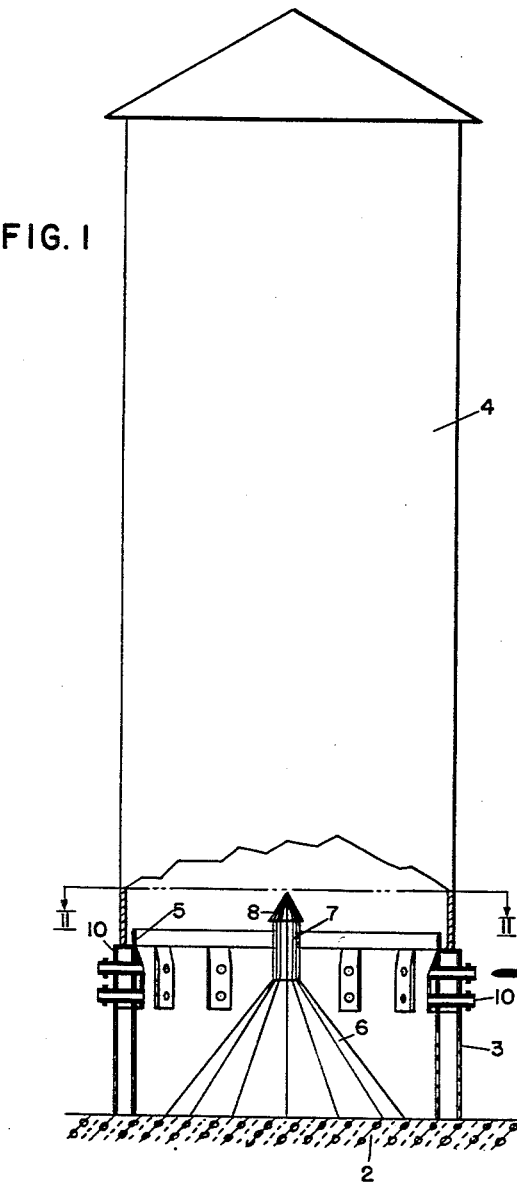
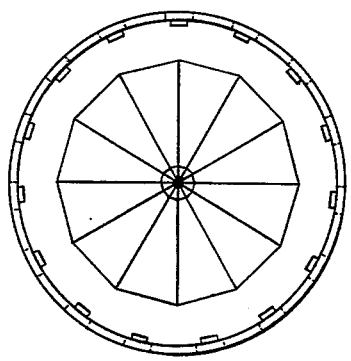
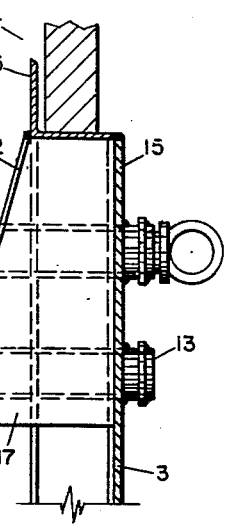
INVENTOR.
MARK E. SINGLEY.
BY
ATTORNEY.

April 5, 1960  M. E. SINGLEY  2,931,335
SILO TYPE SELF-FEEDING HOPPER AND TROUGH
Filed Nov. 23, 1956  2 Sheets-Sheet 2
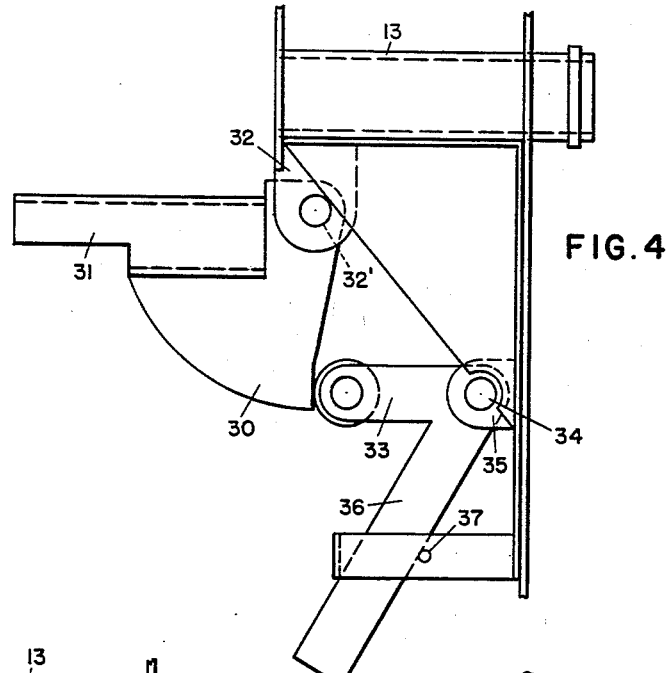
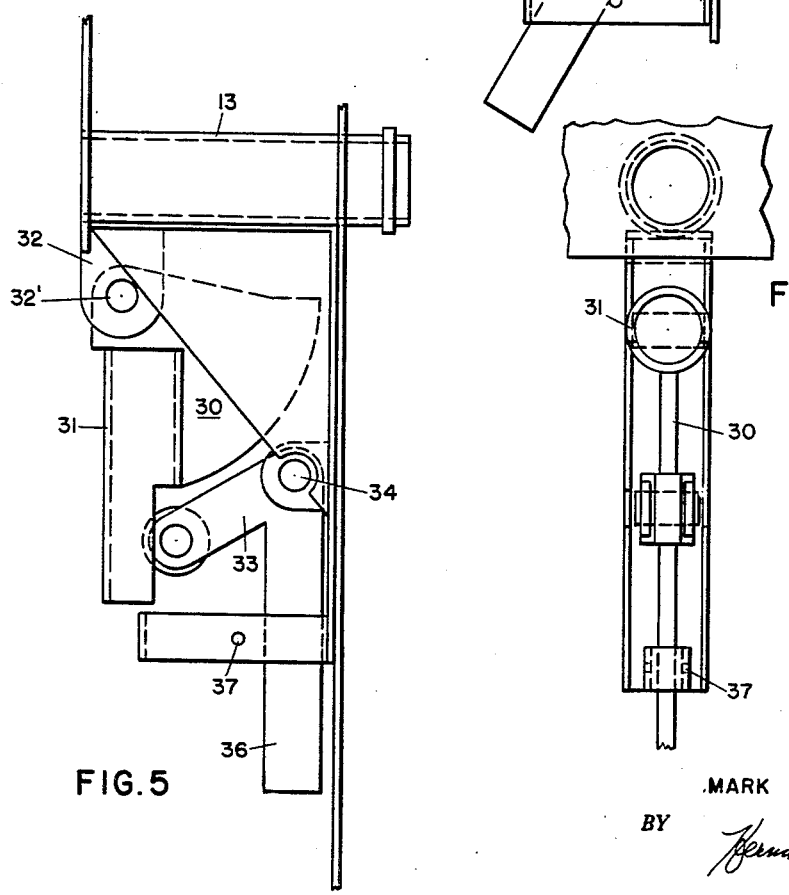
INVENTOR.
MARK E. SINGLEY.
BY
ATTORNEY.

United States Patent Office 2,931,335
Patented Apr. 5, 1960

2,931,335
SILO TYPE SELF-FEEDING HOPPER AND TROUGH

Mark E. Singley, Belle Mead, N.J.

Application November 23, 1956, Serial No. 623,936

3 Claims. (Cl. 119—52)

This invention relates to a method of self-feeding foodstuffs to animals and self-feeding structures for animal foodstuffs and more particularly to a method and apparatus such as a silo to support silage in a silo and to assure movement of the silage downward in the silo as the lower portion of the silage is consumed by feeding animals to replenish automatically the food supply within the reach of the feeding animal without danger of injury to the animal.

In forming silage the customary practice is to fill the silo with foodstuff such as grass, alfalfa, etc. alone or mixed with corn meal, molasses or other materials. Silage as a mass is a fibrous material. Within a silo the great majority of fibers lie in a horizontal plane. The remainder of the fibers may lie in a vertical position or in random positions. When placed in tension axially, those silage fibers in the mass extending along the horizontal plane contribute strength to the mass; fibers at right angles to a horizontal plane contribute no strength, while fibers at intermediate angles contribute intermediate strength.

As a basis of comparison, consider a common cotton thread which consists of uni-directional fibers and possesses desirable strength characteristics only when placed in tension. The greater the tensile forces applied the more individual fibers grasp each other and contribute to the total strength of the thread. However, if the thread is placed in compression axially the individual fibers are released from each other and the thread loses its strength. Silage responds in the same way. When the fibers are placed under tension the mass has great strength. However, when the individual fibers are placed under compression the fibers separate and the mass fails easily. If a suspended mass of silage is restrained from expanding upward by the weight of the mass above and is compressed on the sides, the mass necessarily expands downward in the unrestrained direction and the fibers will separate and balloon out.

The chief object of the present invention is to provide a method of self-feeding foodstuffs such as silage employing this principle.

An object of the invention is to provide a storage chamber for the storage of forage crops from which animals may self-feed so designed as to provide a constricted area in which compressive forces are applied against a mass of silage substantially axially of the majority of the fibers composing the mass, thus releasing and separating the fibers to permit the mass to expand downward, fracturing segments from the mass.

A further object is to provide a storage chamber for the storage of forage crops from which animals may self-feed containing baffles forming a constricted area and support members providing additional or partial support to keep the mass of silage suspended in the silo. Other objects of the invention will be readily perceived by reference to the following description.

The attached drawings illustrate a preferred embodiment of the invention, in which—

Figure 1 is a view partially in elevation and partially in section of the self-feeding structure of the present invention;

Figure 2 is a plan view of the foundation and the supporting members taken on the line II—II of Figure 1;

Figure 3 is a sectional view of the mass constricting members and partial support members of the structure shown in Figures 1 and 2;

Figure 4 is a view in elevation of a modified support member in support position;

Figure 5 is a view in elevation of the support member shown in Figure 4 in retarded or withdrawn position; and Figure 6 is a view in end elevation of the member shown in Figures 4 and 5.

Referring to the drawings there is shown a storage structure for the storage crops from which animals may self-feed such as a silo. The silo includes a concrete foundation or a floor 2, support members 3 in the form of a plurality of circumferentially spaced posts which rest on the outer annular portion of foundation 3 and a hollow cylindrical storage chamber 4 having an open bottom mounted on horizontally extending supports 5. The supports 5 rest on and are secured in place by the vertically extending posts 3. The chamber 4 may be constructed of concrete staves, wood, steel, tile, etc.

A suitable cone-like member 6 which may be in the form of a dodecagon is placed substantially centrally of the foundation and serves to separate and direct the silage outwardly from the mass. Preferably member 6 is provided with a stub center column 7 terminating in a conical end or cap 8 for a purpose hereinafter described. If desired the cap may overhang the column by several inches. It will be noted the column 7 and cap 8 punches through the mass of material above the area of manipulation as hereinafter described. Column 7 prevents the mass from resting on the cone proper, thus preventing the mass from becoming so dense that animals cannot consume it when feeding is initiated.

If desired, a larger diameter conical cap supported by a bearing point at its center may be employed to permit the cap to shift with an unbalance of forces and to adjust itself until balanced by uniform forces. Such construction offers greater support in the center of the silo and permits any jam of material which might occur to release itself.

A plurality of baffle members 10 are spaced about the circumference of the structure adjacent the bottom opening of the storage chamber 4. Baffles 10 are fixed in place and are supported, preferably from supports 5, between adjacent posts 3.

Each baffle 10 includes a bottom portion 11 and an upper portion 12. Bottom portion 11 cooperates with similar portions of other baffles to form a constricted area within the silo extending between the stub center column 7 and portions 11. Portion 12 is inclined downward in the silo so as to direct the mass of silage toward the area of greatest restriction (adjacent portions 11) as well as to form areas of gradually increasing constriction within the silo. Sleeves 13 extend through baffles 10 through which rods or pins 14 may be forced within the mass of silage for a purpose hereinafter described.

Baffles 10 may be formed of a rear plate 15 and a front plate 16 having its upper section extending outwardly to the wall of the silo. Reinforcing plates 17 are provided welded to plates 15, 16. The sleeves 13 extend through plates 15, 16 and are welded in place in the structure. The baffles may be welded to supports 5 if desired.

Considering the operation of the structure, the storage chamber is filled with silage. The spaced baffles 10 provide a constricted area within the silo and partially support the mass of silage in place. When the mass is partially supported by the baffles and at regulated intervals permitted to move downward over them, the silage is compressed radially to conform or adjust to the reduced area and circumferentially to conform or adjust to the smaller circumference.

When the silage is suspended on the peripherally placed baffles 10 and compressed radially, the mass is free to expand downward only, the middle portion of the mass, the constricted area, fracturing and dropping downward. Such action is encouraged by the unsupported weight of the mass in the middle portion thereof. When the mass is compressed circumferentially it is also free to expand downward and outward between the baffles 10. Ballooning occurs and ragged radial fracture planes are created; thus silage resting on the baffles separates into segments for individual manipulation.

As stated above the baffles are fixed in place and provide only partial support of the mass. Pins 14 provide additional support to keep the mass of silage suspended. It is desirable in my invention that baffles 10 be designed to provide maximum, uniformly distributed support and yet not completely support the mass of silage.

Since each baffle and pin combination supports a segment of silage, the silage is subjected to a localized vertical compression. Silage is elastic to some extent so that the mass of silage extends the vertical compressive forces outward horizontally in the approximate shape of a V. This means that material beyond the compressed region or area will attempt to maintain its original condition, resulting in the fracture and separation of silage between the peripheral points of support. The fractures created within the material result from forces of gravity, intermittent vertical compression and horizontal compression thus aiding in the ready manipulation of the silage.

It will be appreciated pins 14 are inserted in the lower sleeves 13 when filling begins. After the silo has been filled to the elevation of the cap 8 on the stub center column 7, the pins 14, baffles 10 and column 7 support the silage mass above them. The silage below remains loose and retains its quality if the base closure is airtight. A suitable plastic layer wrapped around the silo base over the feeding openings and bonded to the metal supports on top and the concrete foundation creates a suitable airtight seal.

After the silo is opened for self-feeding and the silage within the base has been consumed it will be appreciated the mass of silage is still supported and manipulation is required to control the descent of this material. Pins 14 are removed from lower sleeves 13 removing the support such pins provide. The segment of silage that was contained vertically between the pin and the bottom edge of the inclined portion 12 of baffle 10 now expands and is free to drop. Usually, however, it will not drop immediately. Accordingly the pins 14 are then inserted in the upper sleeves 13 and pushed within the mass pushing the segment off the baffle and permitting the segment to drop in the feeding space below. The pin is then withdrawn and reinserted in the bottom sleeve to accept a load again when the silage settles on it. Generally several pins need be employd before the silage slips past the baffles and comes to rest on the pins again. The amount of silage dropped and the location of the drop are controlled by the number and location of the pins manipulated.

In Figures 4, 5 and 6 I have shown a modified form of partial support which may be employed in place of the pins 14 previously described. There is shown in Figure 4, the rotatable shelf member in supporting position. The shelf member includes a plate member 30 carrying a pipe or pin 31 adapted to support the mass of silage. Plate 30 is pivotally supported at 32' from the structure by brackets 32. An on center restraining arm 33 holds plate 30 in position. Arm 33 is rotatable about pivot 34 supported by brackets 35. A handle (hand-operable) 36 is connected to arm 33. When frictional forces are overcome and the arm is moved off center, the weight on the rotating shelf member moves the arm 33 downward out of contact with the rotating pin 31, and plate 30 as shown in Figure 5. The shelf member then can rotate and the mass of silage is freed and drops into the feeding area below. Handle 36 attached to arm 33 provides sufficient leverage to move the arm off center. Preferably, a stop 37 is provided to assure that the weight of the mass does not force arm 33 from its operating position.

The present invention provides a self-feeding structure for the storage of forage crops which is inexpensive and highly satisfactory in operation. A method of manipulation of silage during storage is provided which permits ready feeding of silage to a position in which it may be reached by the animal feeding thereon.

While I have described a preferred embodiment of the invention, it will be understood the invention is not limited thereto since it may be otherwise embodied within the scope of the following claims.

I claim:

1. In a storage structure for the storage of forage crops from which animals may self-feed, the combination of a vertically disposed silo storage chamber having an open bottom, a foundation for the silo storage chamber, first support means placed between the open bottom end of the silo storage chamber and the foundation, a plurality of fixed baffles spaced from one another disposed about the interior of the silo storage chamber and extending into the silo storage chamber, a second support placed substantially centrally of the foundation terminating in a cone-shaped cap-like member extending above said baffles, said baffles being placed adjacent the bottom of the silo storage chamber and being spaced from the foundation, said baffles being supported by said first support means, each baffle including a lower portion serving in combination with the substantially central second support to constrict the area of the silo storage chamber and an upper portion inclined downwardly and inwardly from the walls of the silo storage chamber toward the constricted area formed by the lower portion and the substantially central support.

2. A storage structure according to claim 1 in which sleeves extend through the baffle members to permit pins to be forced therethrough within a mass of silage contained in the storage structure.

3. A storage structure according to claim 2 having pins extending through the sleeves into the mass of silage.

References Cited in the file of this patent
UNITED STATES PATENTS

| 2,189,213 | MacDonell | Feb. 6, 1940 |
| 2,638,871 | Ruedemann | May 19, 1953 |
| 2,691,959 | Dueringer et al. | Oct. 19, 1954 |
| 2,752,885 | Mazur | July 3, 1956 |
| 2,755,770 | Ruedemann | July 24, 1956 |